United States Patent Office 3,554,717
Patented Jan. 12, 1971

3,554,717
SILICON CARBIDE CONTAINING BORON AND NITROGEN IN SOLID SOLUTION
Peter T. B. Shaffer, Grand Island, and Ellsworth D. Whitney, Snyder, N.Y., assignors to The Carborundum Company, Niagara Falls, N.Y., a corporation of Delaware
Filed Jan. 30, 1968, Ser. No. 701,715
Int. Cl. C04b 35/14; B24d 3/02
U.S. Cl. 51—307    8 Claims

ABSTRACT OF THE DISCLOSURE

Beta silicon carbide having boron and nitrogen in replacement solid solution. Material is formed by subjecting mixtures of silicon and carbon in proportions corresponding to 80 mole percent to 20 mole percent silicon carbide, boron in proportions corresponding to 20 mole percent to 80 mole percent boron nitride and nitrogen to temperatures of between about 1300° C. and the decomposition temperature of silicon carbide and pressures of between 10 atmospheres and 7000 atmospheres.

---

This invention relates to a composition of matter particularly suited for use as an abrasive material and more particularly this invention relates to composition of matter comprising replacement solid solutions of boron and nitrogen in beta silicon carbide and to a process for producing said composition of matter.

In abrasives art there is a continuing search for harder materials for use in grinding and polishing hard workpieces. It is commonly accepted that an abrasive material should be at least as hard as the material being worked in order that there be stock removal from the workpiece. Although there are instances where it is advantageous that the abrasive material be only slightly harder than the workpiece, it is usually desired that the abrasive material be as hard as possible in order to achieve the greatest stock removal and reduce abrasive wear. In this connection various hard substances such as diamond and silicon carbide have been used as abrasive materials.

Silicon carbide, although not as hard as diamond, has proven particularly useful as an abrasive material because of its hardness, which exceeds that of most materials except diamond, and because of its excellent mechanical properties. The hardness of silicon carbide, however, is still below that of diamond and so the search for harder and harder materials goes on.

It is an object of this invention to provide a composition having a crystal structure similar to beta silicon carbide and being capable of developing a hardness greater than conventional silicon carbide.

This and other objects and advantages of the present invention will become apparent upon consideration of the following detailed description and accompanying drawings wherein.

The foregoing objects and advantages are achieved by reacting stoichiometric quantities of silicon and carbon necessary to produce silicon carbide under heat and pressure and in the presence of boron and nitrogen to produce beta silicon carbide having boron and nitrogen therein in solid solution. The crystal structure of the resulting composition has been analyzed by X-ray diffraction techniques and it has been found that the crystal structure is cubic, that is substantially the same as beta silicon carbide, but the unit cell dimension is smaller than that of conventional beta silicon carbide. The material is generally harder than conventional silicon carbide although as will be seen later under certain conditions the material has a hardness on the order of the minimum reported hardness of conventional silicon carbide.

The composition of this invention is formed by the application of heat and pressure in a nonoxidizing atmosphere to the starting materials consisting of silicon, carbon, boron and nitrogen. The boron is present in amounts corresponding to about 20 mole percent to about 80 mole percent of boron nitride. Silicon and carbon are likewise present in amounts corresponding to about 80 mole percent to about 20 mole percent of silicon carbide. Boron nitride may be used to supply the boron and nitrogen for the formation of the composition in accordance with this invention or elemental boron may be used with the nitrogen being supplied from a nitrogen containing atmosphere surrounding the starting materials during the formation of the composition of this invention. The solid starting materials are finely divided, being on the order of 100 mesh or finer.

The temperatures employed in this invention range from about 1300° C. to just below the decomposition temperature of silicon carbide. The decomposition temperature of silicon carbide is normally reported as between 2500° C. and 2600° C. However, when employing pressures in accordance with this invention the decomposition temperature is raised and accordingly temperatures above 2600° C. may be used in forming the composition of this invention.

The pressures used to form the composition of this invention may vary widely and excellent results have been obtained with pressures ranging from about 10 atmospheres, up to 7000 atmospheres. The pressures may be applied mechanically, as by hot pressing the starting materials in a suitable hydraulic press or by heating the starting materials within a pressurized autoclave wherein the required pressure is exerted by the surrounding atmosphere within the autoclave.

Figure 1:
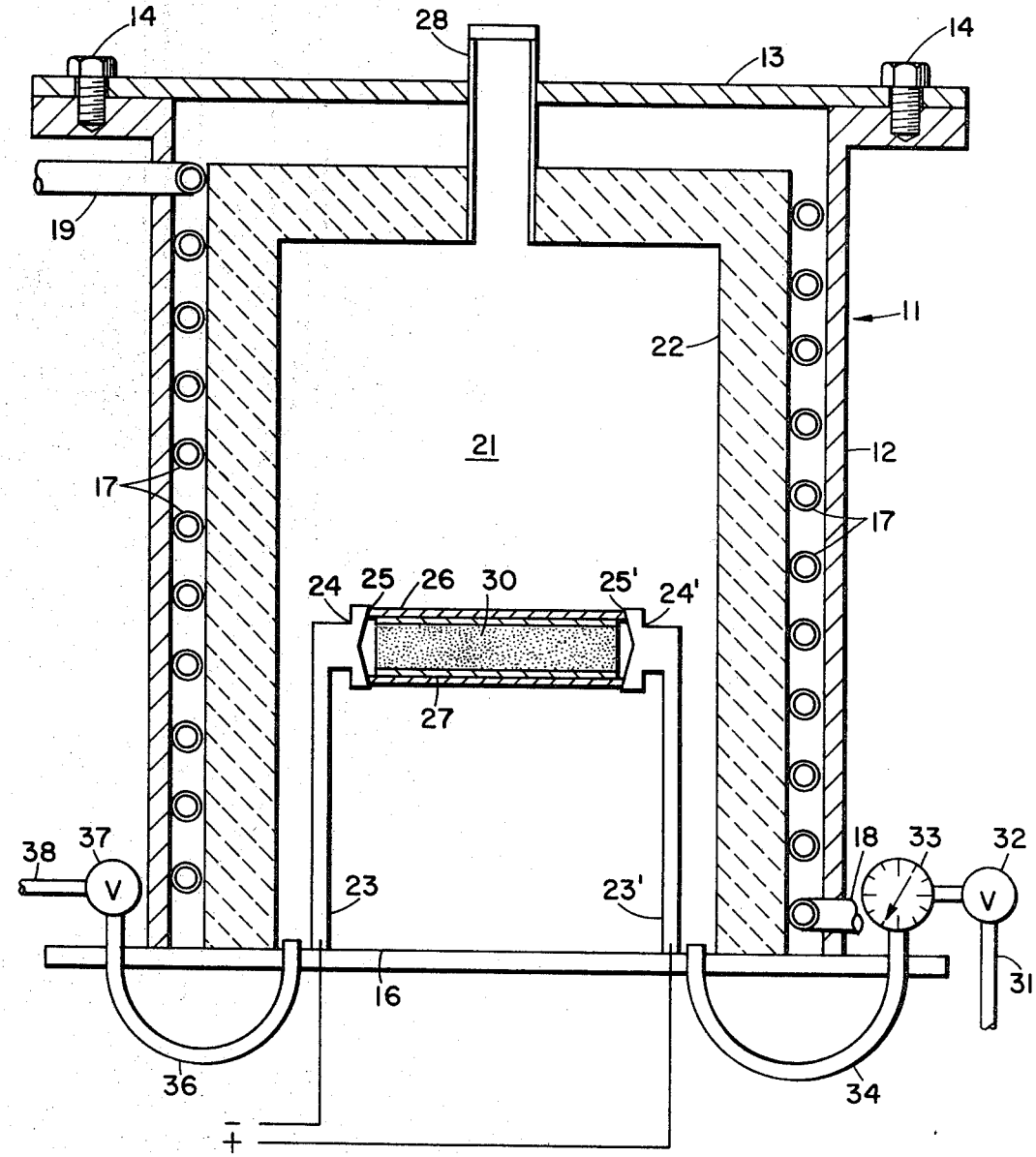
FIG. 1 is a schematic, partially in section of apparatus used in producing the composition of this invention.

Referring to FIG. 1 there is shown a typical apparatus used for producing the composition of this invention wherein the material is heated within a pressure chamber. A pressure chamber, shown generally as 11, comprises a cylindrically shaped body 12 adapted for receiving top in gas tight relationship which is held in place by bolts 14. Chamber bottom 16 is permanently fixed on the bottom end of cylinder body 12 and in gas tight relationship thereto. The walls of cylinder body 12 are cooled by means such as cooling coils 17 which carry a suitable coolant such as water which is introduced into said coil 17 at inlet 18 and is carried out through outlet 19. The inner wall surfaces of cylinder body 12 and top 13 are lined with suitable refractory insulating material 22, said refractory lined surfaces defining reaction chamber 21. An example of such a refractory material is carbon or graphite. Extending upwardly through chamber bottom 16 is a pair of electrically conducting support posts 23 and 23' which terminate at their upper ends with electrically conducting heater support members 24 and 24'. Posts 23 and 23' are electrically connected to a suitable electrical source not shown. Electric resistance heating element 26 is carried between electrically conducting posts 23 and 23' and is electrically connected thereto by means of heater support members 24 and 24' which support element 26 at its ends 25 and 25'. Positioned within heating element 26 is a suitable sample contained 27 which contains the materials 30 to be reacted.

Sight tube 28 passes through top 13 and refractory layer 22 for purpose of viewing heating element 26.

Sight tube 28 is sealed in top 13 thereby to prevent the escape of gases.

The required pressure for the formation according to this invention is provided by means of a source of non-oxidizing gas, such as nitrogen or argon, not shown, and a suitable compressor, also not shown, for compressing the gas to the desired pressure. The compressed gas is led into reaction chamber 21 by means of line 31 which passes through valve 32, gauge 33 and conduit 34 into chamber 21. Conduit 36 is provided for venting off excess gas through valve 37 and line 38 and said conduit can be sealed off by means of valve 37.

In operation the starting materials are placed in a suitable sample container 27 made of graphite or boron nitride which in turn is positioned in heating element 26. Heating element 26 is then positioned between heater support members 24 and 24'. Once the sample has been positioned top 13 is placed on cylinder body 12 and bolts 14 are turned down so as to hold top 13 in gas tight relationship with body 12. Chamber 21 is evacuated by suitable means such as by closing valve 32 and drawing a vacuum through line 38, valve 37 and conduit 36. Once chamber 21 is evacuated valve 37 is closed and valve 32 is positioned into the open position and the nonoxidizing gas is led into chamber 21 through line 31, valve 32, gauge 33 and conduit 34. A compressor, not shown, operates to compress the gas in chamber 21 to the desired pressure. Once the desired pressure has been achieved, as measured by means of gauge 33, valve 32 is placed in closed position. Electric current is passed through heating element 26 by means of passing through support posts 23 and 23' and heater support members 24 and 24'. Heating element 26 temperature is measured by an optical pyrometer through sight tube 28.

As the temperature within reaction chamber 21 increases the gas pressure therein also tends to increase. The pressure may be maintained constant by periodically venting the gas off through conduit 36 by means of opening valve 37.

Once sample container 27 reaches the desired temperature the current to heater 26 is cut back to a point where sufficient current is passing therethrough to maintain the desired temperature. The sample container is held at temperature for about 5 minutes and then the power is abruptly cut off.

It is to be noted that at the temperature and pressures employed in this invention both heating elements 26 and sample container 27 are substantially porous and the gas contained in chamber 21 has ready access to the starting material. However, if desired, heater element 26 and sample container 27 may be provided with perforations in order to assure access of the gas to the starting materials.

The following illustrates a preferred method for producing the composition according to this invention.

EXAMPLE 1

Using the apparatus as shown in FIG. 1, two sets of runs using starting materials of varying composition were performed at a temperature of 2500° C. at 32 atmospheres pressure and using an atmosphere of nitrogen.

Set A consisted of six runs and each run had as starting materials silicon, carbon and boron nitride. In each run the proportion of boron nitride expressed in mole percent was varied so that it ranged from 20 mole percent in run 1 to 99 mole percent in run 6. In each run high purity materials were used, the boron nitride being 99.8% pure and the carbon and silicon being 99.98% pure. The starting materials, finely divided, were placed in a graphite sample container which was then placed in the apparatus of FIG. 1 as described above. The starting materials were heated to a temperature of about 2500° C. at a pressure of 32 atmospheres for 5 minutes. At the completion of this reaction time the sample was cooled, the apparatus opened and the sample container removed. A portion of the sample container was cut and polished with diamond abrasives for microhardness tests of the contents thereof while the remainder was crushed and subjected to X-ray analysis. The results are set forth in Table A below.

TABLE A.—X-RAY DIFFRACTION ANALYSIS AND MICROHARDNESS TESTS ON MATERIAL FORMED IN RUNS 1-6

| | Mole percent | | Major phase | Unit cell dimension, A. | Average Microhardness, kg./mm.$^2$ |
|---|---|---|---|---|---|
| | BN | Si+C | | | |
| Run No.: | | | | | |
| 1 | 20 | 80 | β-SiC | 4.3515±.0005 | 2,880 |
| 2 | 40 | 60 | β-SiC | 4.3499±.0009 | 2,290 |
| 3 | 60 | 40 | β-SiC | 4.3498±.0006 | 2,900 |
| 4 | 80 | 20 | β-SiC | 4.3512±.0004 | 3,100 |
| 5 | 90 | 10 | BN | | (¹) |
| 6 | 99 | 1 | BN | | (¹) |

¹ Crystals too small to measure hardness.

Set B consisted of runs 7 through 12 which were performed in the manner of runs 1 through 6 of set A except that elemental boron was used in place of the boron nitride. The quantities of elemental boron used in the starting mixtures correspond to 20 to 99 mole percent boron nitride. The nitrogen was supplied from the surrounding gaseous atmosphere. The boron used was 99.6% pure and was finely divided, having a particle size of less than 325 mesh. The silicon and carbon were the same as used in runs 1 through 6 above. The results are set forth in Table B below.

TABLE B.—RESULTS OF X-RAY DIFFRACTION AND MICROHARDNESS TESTS ON MATERIAL FORMED IN RUNS 7-12

| | Mole percent | | Major phase | Unit cell dimension, A. | Average microhardness, kg./mm.$^2$ |
|---|---|---|---|---|---|
| | BN | Si+C | | | |
| Run No.: | | | | | |
| 7 | 20 | 80 | β-SiC | 4.3481±.0005 | 2,630 |
| 8 | 40 | 60 | β-SiC | 4.3464±.0005 | 2,495 |
| 9 | 60 | 40 | β-SiC | 4.3498±.0005 | 2,760 |
| 10 | 80 | 20 | β-SiC | 4.349±.0001 | 2,850 |
| 11 | 90 | 10 | β-SiC-B⁴C | 4.353 | (¹) |
| 12 | 99 | 1 | B⁴C | | (¹) |

¹ Crystals too small to measure hardness.

Figure 2:
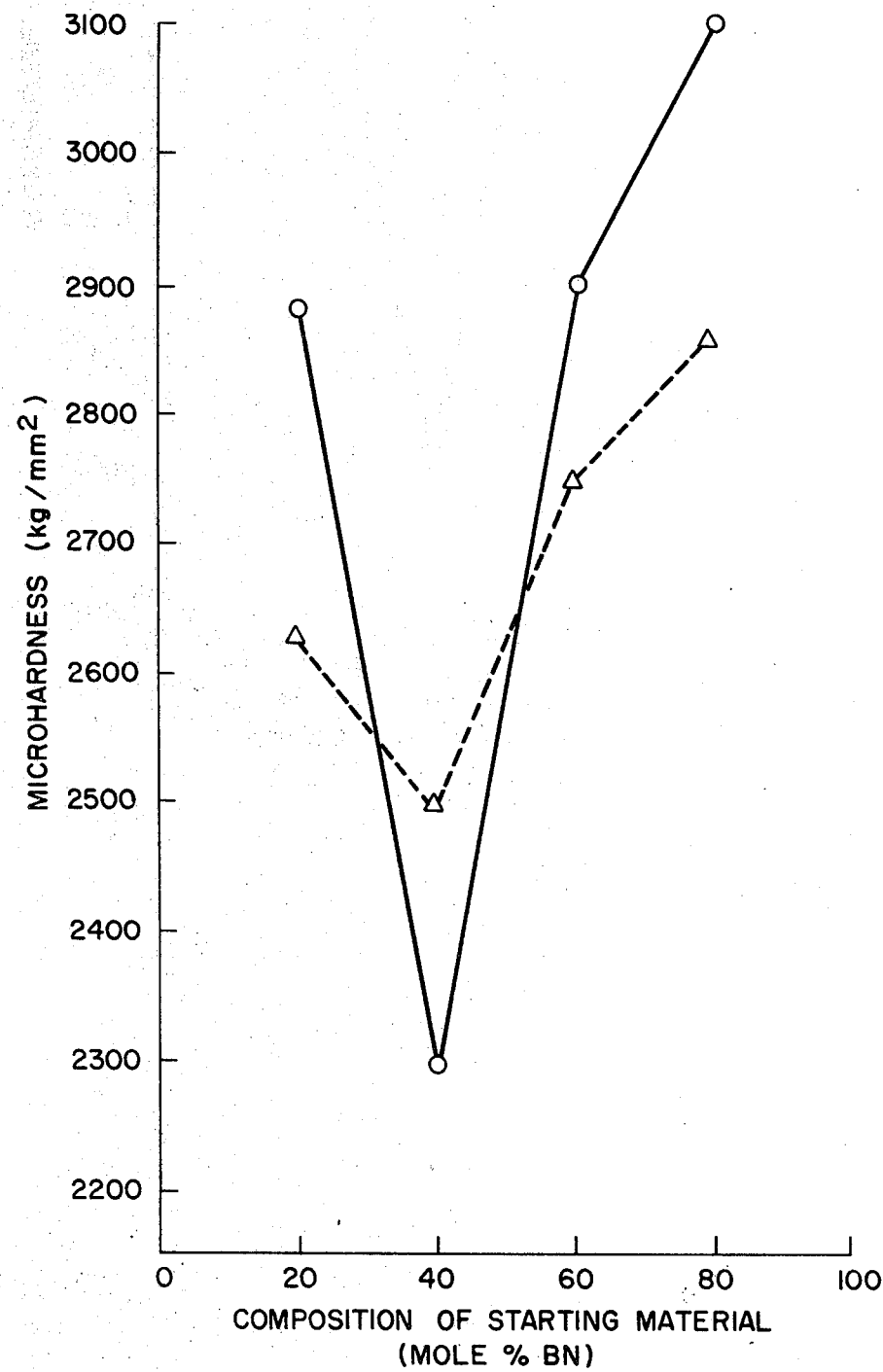
FIG. 2 is a graph of the microhardness of the finished composition of this invention versus the composition of the starting materials.

Referring to FIG. 2 there is shown a graph of the plotted microhardness of the materials made in runs 1 through 12 versus the mole percent boron nitride present in the composition of the starting material. The solid line represents the materials from runs 1 through 6 where boron nitride was used in the starting composition while the dotted line represents the material in runs 7 through 12 where elemental boron was used in the starting composition.

In comparing the hardness of this material with conventional silicon carbide it is to be noted that the hardness values of silicon carbide have been reported as ranging from as low as 2300 kg./mm.$^2$ to as high as about 2900 kg./mm.$^2$. An average figure of 2600 was taken as the hardness for conventional silicon carbide. It is to be noted that the microhardness of the material made in accordance with Example 1 is higher in all cases except those where the starting composition contained 40 mole percent boron nitride. This dip in hardness cannot be explained, but it is to be noted that even at 40 mole percent boron nitride in the starting composition the hardness of the composition still makes it attractive for use as an abrasive material.

The X-ray diffraction data reported in Tables A and B indicate the major phase of the material after being heated under pressure to be beta silicon carbide. This is not unexpected since there are stoichiometric quantities of silicon and carbon present which under the conditions stated in the example would be expected to react to form silicon carbide. However, upon analysis of the unit cell dimension it was noted that while conventional beta silicon carbide has a unit cell dimension of 4.359±.005 A., the unit cell of the material made according to this example had decreased to 4.348±.002 A. This unit cell size remained relatively constant even though the proportion of boron nitride in the starting material was increased up to about 80 mole percent. Such a decrease in unit cell dimension indicates that there has been a replacement solid solution of boron and nitrogen in the silicon carbide lattice.

It is to be noted when boron and nitrogen are present in the starting materials in amounts equal to or exceeding about 90 mole percent boron nitride, that the major phase is no longer beta silicon carbide. For the purposes of this invention, therefore, it is preferred to maintain the quantities of boron and nitrogen in amounts corresponding to less than 90 mole percent boron nitride.

Although as indicated by Example 1 good results are achieved when the starting materials are present in quantities corresponding to 20 mole percent to 80 mole percent boron nitride and 80 mole percent to 20 mole percent silicon carbide, it is preferred that the quantity of boron and nitrogen correspond to 40 mole percent to 80 mole percent boron nitride. The higher molar percentages of boron nitride are preferred for several reasons. First, the hardness of the material increases with increasing molar percentages of boron nitride until about 80 mole percent boron nitride is reached. Secondly, recovery of the composition of this invention from any unreacted starting materials is easier when there is an excess of boron nitride since the separation of the composition of this invention from the excess boron nitride is comparatively simple and can be done by conventional flotation or chemical means.

Although the foregoing example illustrates the formation of the material of the invention at relatively low pressure in a high temperature furnace, good results have been achieved at very much higher pressures, on the order of 5,000 to 50,000 atmospheres at lower temperatures ranging from 600° C. to 1700° C. When operating at such high pressures, however, it is necessary to use mechanical pressure rather than gas pressure and the runs are carried out in high pressure apparatus which is adapted for heating the samples to the desired temperature under nonoxidizing conditions. An example of a typical press which can be used to produce the composition of this invention is disclosed by Hall in U.S. Pat. No. 2,941,248. The method of producing the composition of this invention as set forth in Example 1 is the preferred method, however, since it is adaptable for scaling up to produce commercial size quantities of the novel composition of this invention.

Although the primary utility for the composition of this material would appear to lie in the abrasives field, it is clear that such a material when formed into suitable shapes should produce a very wear resistant article. Consequently, the use of the composition of this invention is suggested for rocket nozzles, suction box covers, and the like where hardness and wear resistance are desired.

From the foregoing comments it is readily apparent how the present invention accomplishes its various objectives. While the invention has been described and illustrated herewith the reference to certain preferred embodiments thereof, it is to be understood that it may be otherwise embodied within the scope of the appended claims.

We claim:
1. A composition of matter suitable for use as an abrasive material consisting essentially of silicon carbide having therein boron and nitrogen in solid solution, the silicon and carbon being present in amounts corresponding to from about 20 mole percent to about 80 mole percent of silicon carbide, and the boron being present in an amount corresponding to from about 80 mole percent to about 20 mole percent boron nitride, the composition having a cubic crystal structure and a unit cell dimension smaller than the unit cell dimension of cubic silicon carbide.

2. A raw batch for producing a composition suitable for use as an abrasive material consisting essentially of elemental silicon, elemental carbon, boron and nitrogen, the silicon and carbon being present in amounts corresponding to from about 20 mole percent to about 80 mole percent of silicon carbide and the boron being present in an amount corresponding to from about 80 mole percent to about 20 mole percent boron nitride.

3. The raw batch of claim 2 wherein the boron is present in an amount corresponding to from about 40 mole percent to about 80 mole percent boron nitride.

4. The raw batch of claim 2 consisting essentially of elemental silicon, elemental carbon and boron nitride.

5. A process for producing the composition of claim 1, comprising subjecting starting materials consisting essentially of elemental silicon and elemental carbon in amounts corresponding to 20 mole percent to 80 mole percent silicon carbide, boron in an amount corresponding to 80 mole percent to 20 mole percent boron nitride, and nitrogen, to pressures of between about 10 atmospheres and 7000 atmospheres, and temperatures of between about 1300° C. and the decomposition temperature of silicon carbide, in a nonoxidizing atmosphere.

6. The process of claim 5 wherein the starting materials consist essentially of elemental silicon and elemental carbon in amounts corresponding to 40 mole percent to 80 mole percent silicon carbide, boron in an amount corresponding to 60 mole percent to 20 mole precent boron nitride and nitrogen.

7. The process of claim 5 wherein said boron is present as boron nitride.

8. The process of claim 5 wherein said pressure is about 32 atmospheres and said temperature is about 2500° C.

References Cited
UNITED STATES PATENTS

| | | | |
|---|---|---|---|
| 2,636,825 | 4/1953 | Nicholson | 51—307 |
| 2,887,393 | 5/1959 | Taylor | 51—307 |

DONALD J. ARNOLD, Primary Examiner

U.S. Cl. X.R.
51—309; 106—44